Figure 3:
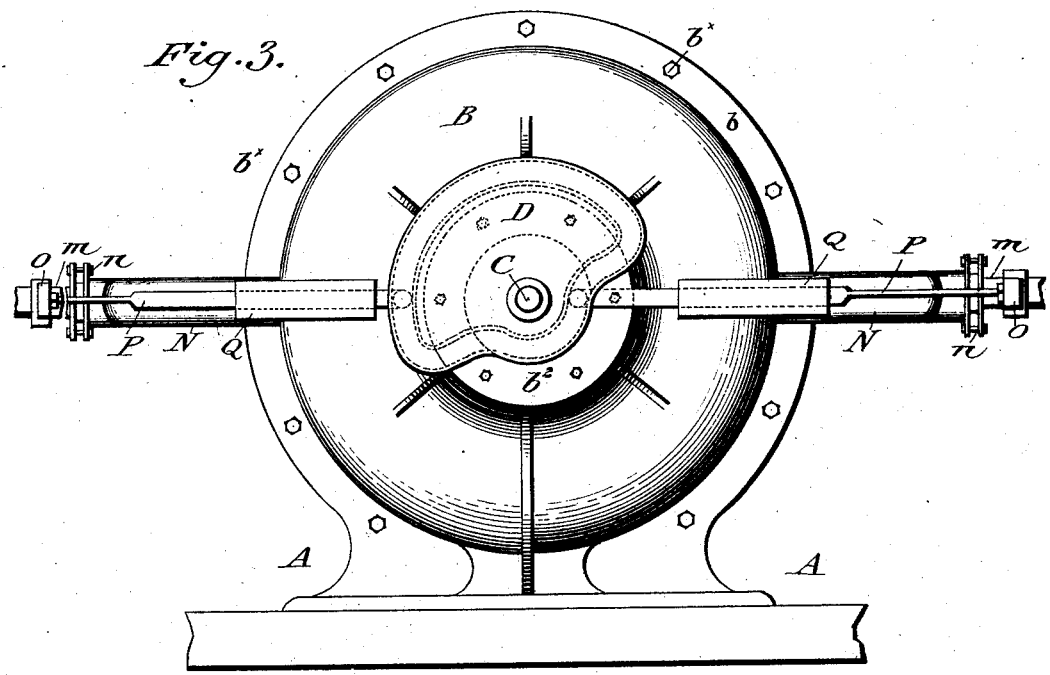

(No Model.) 2 Sheets—Sheet 1.
S. P. M. TASKER.
PNEUMATIC ENGINE.
No. 364,451. Patented June 7, 1887.
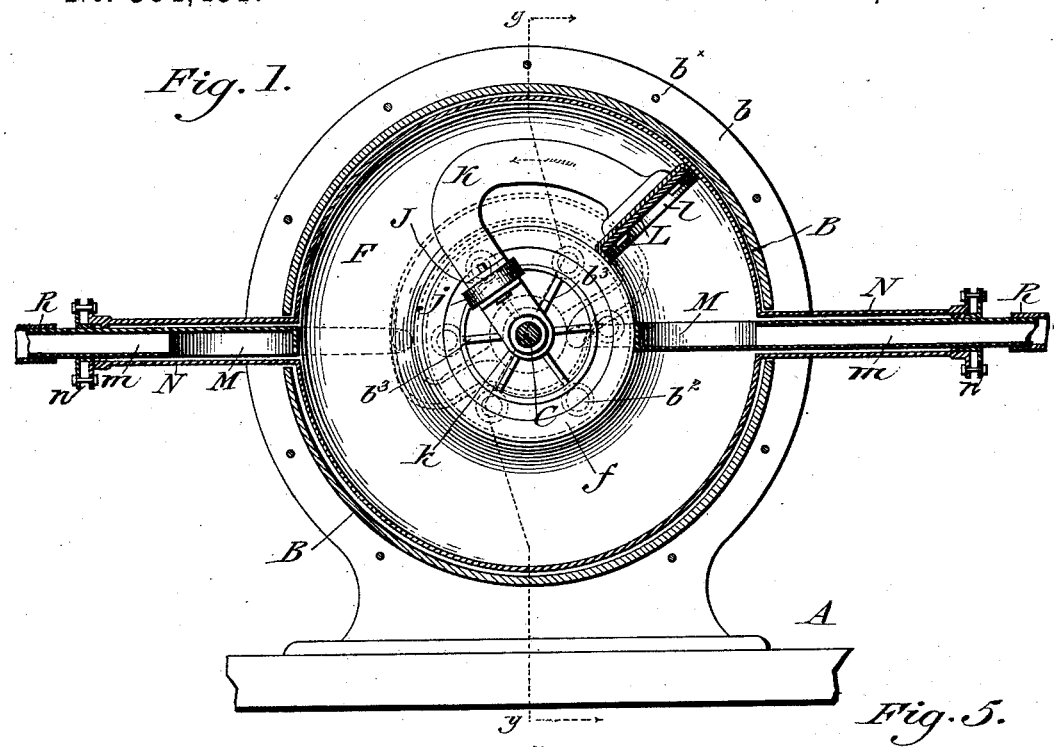
*Fig. 1.*
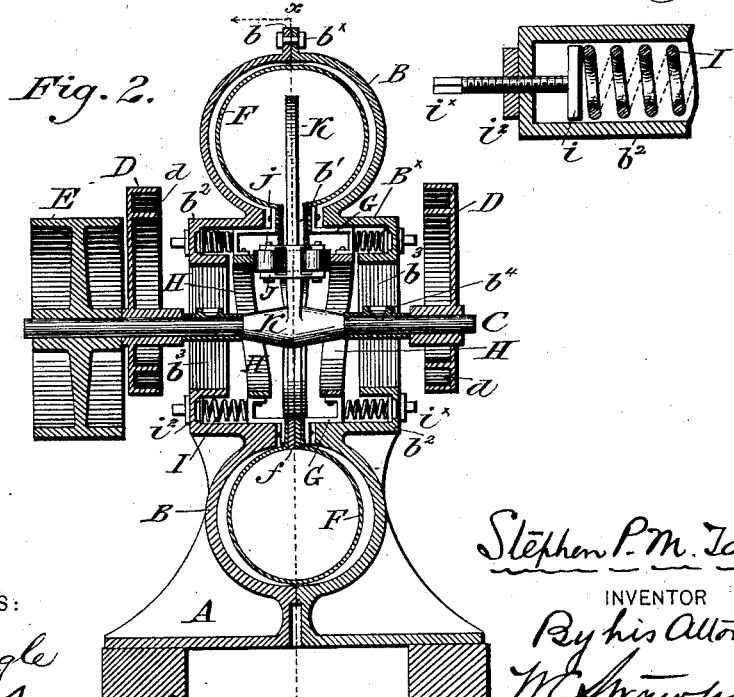
*Fig. 2.*     *Fig. 5.*
WITNESSES:
P. F. Nagle
John Tolley Jr
Stephen P. M. Tasker,
INVENTOR
By his Attorneys,
W. E. Trawbridge,
H. Bonsall Taylor (No Model.) 2 Sheets—Sheet 2.

S. P. M. TASKER.
PNEUMATIC ENGINE.

No. 364,451. Patented June 7, 1887.

WITNESSES:
P. F. Nagle.
John Folley

Stephen P. M. Tasker
INVENTOR
By his Attorneys,
W. C. Strawbridge,
J. Bonsall Taylor N. PETERS, Photo-Lithographer, Washington, D. C.

UNITED STATES PATENT OFFICE.

STEPHEN P. M. TASKER, OF PHILADELPHIA, PENNSYLVANIA.

PNEUMATIC ENGINE.

SPECIFICATION forming part of Letters Patent No. 364,451, dated June 7, 1887.

Application filed December 17, 1886. Serial No. 221,855. (No model.)

*To all whom it may concern:*

Be it known that I, STEPHEN P. M. TASKER, a citizen of the United States, residing in the City and County of Philadelphia in the State of Pennsylvania, have invented an Improvement in Pneumatic Engines and Motors, of which the following is a specification.

The object of my invention is the construction of an inexpensive and durable engine or motor adapted to be operated by compressed air, air under any desired pressure, steam, gas, or other motive fluid.

The motor itself embodies in its construction and mode of operation certain features of construction and operation invented by me and which constitute the subject matter of an application for patent for Pneumatic Apparatus for the propulsion of Vehicles, filed October 9th, 1886, as serial No. 215,796, in which said application is set forth the broad idea of the construction of a pneumatic tube or duct which is slit in the direction of its length, but has the lips or the edges of its slit sprung together, which contains a pneumatic carrier or follower adapted to travel through it under the influence of compressed air or other motive fluid, and which is equipped with devices for transiently wedging apart the lips of the duct in order to admit of the passage through such wedged-apart lips of a yoke or carrier bar connected with the carrier or follower and with an external vehicle.

In my present invention I employ an endless tube or duct which is formed with a continuous slit the edges of which are normally sprung or otherwise held together but are adapted to be transiently opened or sprung apart, and which contains a piston or follower, a piston arm yoke or carrier bar from which is provided with suitable devices for transiently wedging open the lips of the slit, and is connected with a shaft concentric with the duct, to which, by the travel of the piston within the tube under the influence of motive fluid admitted by suitably operated valves to within said tube, it imparts a rotary motion.

A machine embodying my improvements is represented in the accompanying drawings and described in this specification, the particular subject matter claimed as novel being hereinafter definitely specified.

Figure 4:
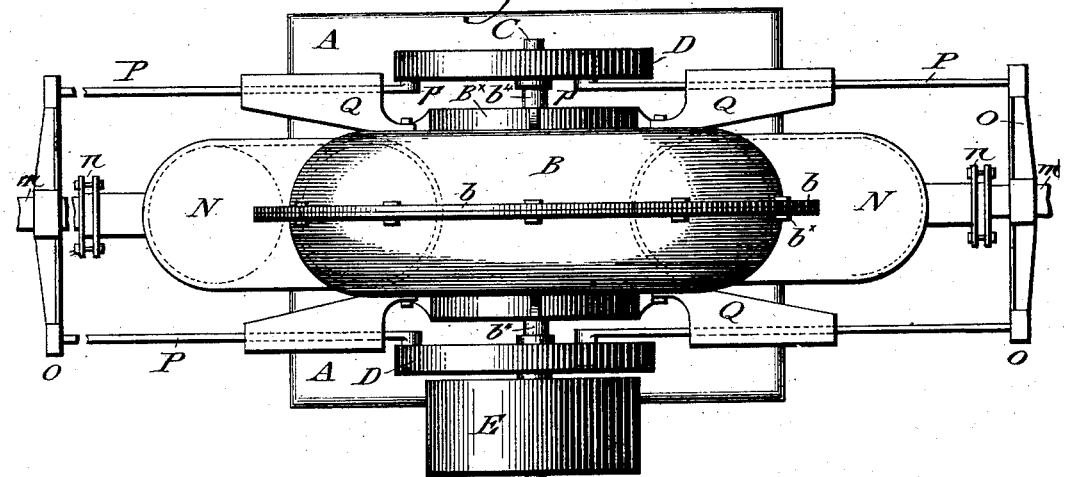

In the drawings, Figure 1 is a central vertical sectional side elevation in the plane of the dotted line $x\,x$ of Fig. 2, and sight being taken in the direction of the arrows upon said line. Fig. 2 is a central vertical transverse sectional elevation view through the apparatus of Fig. 1 in the plane of the dotted line $y\,y$ upon said figure, and sight being taken in the direction of the arrows upon said line, the piston, hub, shaft, and spreading truck not, however, being sectioned. Fig. 3 is a side elevation of the entire device, the pulley being supposed removed; Fig. 4 is a top plan view of the apparatus of Fig. 3; and Fig. 5 a fragmentary sectional detail of one of the spring sockets and its applied contrivances.

Similar letters of reference indicate corresponding parts.

In the drawings, A is a base or bed plate which supports a circular cylindriform casing B, or continuous tubular jacket, preferably made, together with the base or bed plate, in two sections respectively provided with circular external peripheral flanges $b$ connected together by bolts $b^\times$.

The casing is internally provided with a central, internally peripheral, radial slot or opening $b'$, and with a circular horizontal flange $B^\times$ extending laterally in both directions from the circular slot or opening $b'$, the said flange following the internal circular outline of the casing, and being provided with a series of oppositely disposed internally-facing sockets $b^2$ for containing springs, from which sockets webs $b^3$ radiate inwardly to support boxings $b^4$ within which a shaft C is journalled in concentricity with the casing. Upon the shaft beyond the respective boxings are mounted two sister cams D, the cam ways $d$ of which are eccentric with respect to the axis of the shaft and of an irregular although continuous path of substantially the outline represented in the drawings. One extremity of the shaft is conveniently prolonged and equipped with a fixed band wheel, pulley, or kindred driven device E.

The tubular inclosing casing B contains a continuous or endless circular pneumatic tube F of suitable elastic material, which, in the disposition of parts represented, is provided as to its internal periphery with a continuous slit which is in alignment with the continuous circular slot $b'$ of the casing, and the edges or lips of which are faced with continuous packing rings $f$ of rubber or other soft or elastic material, which, when firmly pressed and held together constitute the pneumatic tube an airtight device capable of safe subjection to any such pneumatic or other pressure as the material of the walls of the tube are capable of withstanding.

G are a double series of circularly disposed and preferably equi-distant rail brackets, each conveniently in the form of an angle iron, and which as to their inner extremities are connected with the exterior faces of the continuous packing rings which bound the edges of the slit in the pneumatic tube. Each series of these rail brackets,—and by "each series" I mean such of the brackets as lie upon a given side of a diametric axial plane vertically bisecting the pneumatic tube,—is fixedly provided as to their outer extremities with a continuous circular spring rail H, the two rails being correspondent and preferably flat bands of exceptionally elastic material. The rail brackets G, as represented in the drawings, are disposed in opposing pairs and when forced together by pairs close together the packing rings which are applied to the respective edges of the slot of the tube and retain the latter pneumatically tight. Many means for maintaining this closure of the edge packings of the tube may be resorted to, but perhaps the simplest is a set of spiral springs I adjusted to bear against the exteriors of the rail brackets and by their stress to normally maintain the latter together. For convenience and to permit of ready adjustment, I place these spiral springs within the spring sockets $b^2$ above described, and provide each socket with an internal follower $i$ controlled by an adjusting bolt $i^x$ threading through the socket and controlled as to its set by a lock nut $i^2$. By the adjustment of the bolts the tension of the springs is regulated and the rail brackets maintained together at a given tension.

It will now be obvious that if the spring rails, which when unsprung occupy planes parallel with each other and with the plane of the diametric vertical axis of the tube, are spread apart by any instrumentality they will occasion to the extent to which they are sprung apart the separation of certain of the pairs of rail brackets, the opening to a corresponding extent of the slit in the pneumatic tube, and the compression of the spring rails which bear within the range of their movement, and that when the instrumentality for spreading them is removed they the said rails, under the stress of the springs reinforced by their own elasticity, will reassume their parallelism and close the slit in the pneumatic tube.

The instrumentality which I employ to occasion the opening to a limited extent of the slit of the pneumatic tube is what I term a spreading truck J, the same being a device containing, in the form of apparatus represented, a pair of rollers $j$ journalled on parallel fixed axles, and running between the spring rails or against the inner edges of said rails,— the rollers, being together, or as a pair, of a greater breadth than the normal breadth between the spring rails, serve, as the truck is propelled, to spread said spring rails to a limited extent both before and behind said truck. This truck is mounted upon a curved piston arm K, one extremity of which is formed into a hub $k$ keyed upon the shaft, and the other extremity of which is provided with a piston L, or circular disk, carrier, or follower, provided with a packing $l$ to cause it to fit snugly within the pneumatic tube. The piston arm passes through that portion of the pneumatic tube which is for the time being open by reason of the spread given to the spring rails by the rollers of the truck which is attached to said piston arm.

It will now be understood that any impulse imparted to the piston within the pneumatic tube, is also imparted to the curved piston arm and to the spreading truck with which said arm is provided. It will be observed by a reference to Fig. 1 that the piston arm is as to a portion of its length straight and radial to the shaft, said straight portion being that which is provided with the spreading truck and which passes through the temporary opened slit of the tube, and that, beyond the region of its entrance into the tube, said arm is curved backward and prolonged, conveniently through an arc of say eighty degrees, before it is equipped with its piston, this curvature and prolongation being for the purpose of removing the piston beyond the region of the temporary opening of the slot in order that at the point of the contact of the piston with the interior walls of the tube, the tube may be tightly closed.

It is obvious that if force be exerted against the face of the piston to an extent great enough to drive it along (or more strictly around) the tube, the curved piston arm with its spreading truck will in advance of the piston open the slit in the tube to permit the passage of the arm and the movement of the piston in the direction of the arrow in Fig. 1.

The force which I employ to propel the piston is preferably compressed air, which I introduce within the tube, behind the face of the piston, at one, two, or more, but preferably at two points, by a valve contrivance, which is conveniently of the following construction:—

M are a pair of saucer-shaped or wall-sided radially moving disk valves, which operate with respect to the pneumatic tube, upon diametrically opposite sides thereof, in valve chambers N radially extended from the exterior of the tube through suitable openings in the casing and preferably composite of the material of which the tube itself is composite. Each of these valve chambers has sufficient radial projection beyond the casing to receive within it its own disk valve, and it is shaped to closely encase the said valve. Each of the said chambers at its outer end is provided with a stuffing box $n$ through which passes air tight a hollow valve stem $m$ which carries the disk valve of the chamber in question, the valve stems being each of sufficient extent to permit its valve to pass completely within or into the tube.

Beyond the stuffing box each valve stem is provided with a transverse cross head O which is parallel with the shaft, the two cross heads being opposite and preferably each in a horizontal plane transversely diametric of the casing and tube and bisecting the shaft. To each cross head are connected two pitmen P which are, by pairs, parallel with each other and with the valve stem and which pass through bearings Q supported from the casing, at their outer extremities being rigidly connected with their cross head and at their inner extremities,—the pitmen being all of the same length,—being provided with cam toes $p$ conveniently equipped with friction rolls and entered within the cam ways of the cams D upon the shaft, as a reference to Fig. 4 of the drawings will make clear.

Beyond the cross head the valve stems are connected with flexible sections of tubes R in turn connected with a source of air, gas, or other motive fluid supply.

The disk valves themselves, considered with respect to each other, are disposed to face in opposite directions, but, considered with respect to the piston both disposed to face in the direction of its travel.

Such being a description of a good form of a machine embodying my improvements, its operation will be readily understood:

Air or other motive fluid introduced under pressure to the valve stem of one of the valves which has for the time being, by the action of its operative cams, been thrown within the tube, enters the tube and acts against the face of the piston, causing the latter to travel in the direction of the arrow in Fig. 1, by so doing, through the curved piston arm, causing the rotation of the shaft, and through the spreading truck causing the opening of the slit in the tube in advance of the piston to permit the passage of the arm and give vent to the air contained within the tube. This movement of the piston continues until, in the form of apparatus represented, it passes the second valve, which occurs at a time when the cams by their form and timing have operated to close or force inward said second valve and retract or open the first valve through which the air has theretofore been admitted, with the result that the air admitted through the second valve acts upon the piston to propel it to just beyond the point of entrance of the first valve, whereupon, the valves, through the cams, again reverse themselves and the operation continues so long as the motive fluid is continuously supplied, the pressure from a continuous supply of such fluid being constant upon the piston.

Although the apparatus in the form represented is a good one, I do not restrict myself to the precise form, location, and relative disposition of the parts constituting the machine as an entirety, as there are many modifications which will be obvious to a mechanic: Thus, for instance, the casing proper is not an essential of the machine, as any housing or frame adapted to support the tube, the spring sockets, the boxings for the shaft, the rail brackets, and the other connected devices, may be substituted for the casing represented: Thus, also, the slit in the tube may, by a suitable curvature of the piston arm, be placed at the side or upon the outer periphery of the tube: Thus, again, the valve-stems may be moved by a single cam, although the double arrangement conduces to certainty of operation. I do not, moreover, as stated, confine myself to the use of air, but contemplate the employment of steam, gas or other motive fluid, although air, under the requisite pressure, is preferable, as it can be carried through pipes from long distances without loss of power,—a central station for supplying air being a convenient means for running a number of motors at distances apart,—and I, therefore, employ the term "pneumatic" in the claims in a broad sense.

By increasing the proportions and especially the diameter of the tube and lengthening the piston arm a greater lever power is secured; while the power may also be augmented by the employment of several pistons operating in connection with a larger number of valves than two.

Having thus described my invention, I claim:—

1. The combination to form a pneumatic engine or motor, of a circular or endless tube or duct of elastic material which is slit in the direction of its circumference but has the lips or edges of its slit normally closed together,— a piston, disk, or follower fitted within and adapted to be driven around said tube or duct,—a rotatable shaft concentrically mounted with respect to said tube or duct,—an arm connecting said piston head to said rotatable shaft, and in their rotary movement passing between, and in the vicinity of its passage separating, the normally closed lips of the slit formed for it in said tube or duct,—and valves for supplying motive fluid to the piston head,—substantially as set forth.

2. The combination to form a pneumatic engine or motor, of a circular or endless tube or duct which is slit in the direction of its circumference but has the lips or edges of its slit normally closed together; a piston, disk, or follower, fitted within and adapted to travel around said tube, and mounted upon an arm formed to pass through a temporarily open portion of the slit in the tube and connected with a rotatable shaft concentrically mounted with respect to the tube; devices essentially such as described travelling with the piston arm to transiently for a predetermined distance spread the lips of the tube in order to admit the passage of the arm; valves for supplying motive fluid to the tube; and means for operating said valves; substantially as set forth.

3. The combination to form a pneumatic engine or motor, of a circular or endless tube or duct which is slit in the direction of its circumference but has the lips or edges of its slit normally closed together; suitable means essentially such as shown for maintaining the edges of the slit in temporary union; a piston, disk, or follower, fitted within and adapted to travel around said tube; a curved arm which at one of its extremities carries the piston, which passes through an open portion of the slit in the tube, and which at its other extremity is fixedly mounted upon a rotatable shaft boxed in concentricity with the tube; devices travelling with the piston arm to transiently for a predetermined distance spread the lips of the tube in order to admit the passage of the arm; alternately or successively operating disk valves conformed to fill the interior of the tube and adapted to be introduced within said tube or withdrawn from it; cams upon the shaft; and valve operating devices operated by said cams for occasioning the introduction and withdrawal of the valves; substantially as set forth.

4. The combination to form a pneumatic engine or motor, of a circular or endless tube or duct which is slit in the direction of its circumference but has the lips or edges of its slit normally closed together; a piston, disk, or follower, fitted within and adapted to travel around said tube, and mounted upon an arm formed to pass through a temporarily open portion of the slit in the tube and connected with a rotatable shaft concentrically mounted with respect to the tube; a spreading truck connected and travelling with the piston arm to transiently wedge apart for a predetermined distance the lips of the tube in order to admit the passage of the arm; valves for supplying motive fluid to the tube; and means for operating said valves; substantially as set forth.

5. The combination to form a pneumatic engine or motor, of a circular or endless tube or duct which is slit in the direction of its circumference but has the lips or edges of its slit normally closed together; suitable means for maintaining the edges of said slit in temporary union; a piston, disk, or follower, fitted within and adapted to travel around said tube, and mounted upon an arm formed to pass through a temporarily open portion of the slit in the tube and connected with a rotatable shaft concentrically mounted with respect to the tube; a spreading truck connected and travelling with the piston arm to transiently wedge apart for a predetermined distance the lips of the tube in order to admit the passage of the arm; valves for supplying motive fluid to the tube; means for operating said valves; and a rigid casing or housing for supporting and maintaining the relative disposition of the said assembled elements; substantially as set forth.

6. The combination to form a pneumatic engine or motor, of a circular or endless tube or duct which is slit in the direction of its circumference but has the lips of edges of its slit normally closed together; a piston, disk, or follower, fitted within and adapted to travel around said tube, and mounted upon an arm formed to pass through a temporarily open portion of the slit in the tube and connected with a rotatable shaft concentrically mounted with respect to the tube; devices travelling with the piston arm to transiently for a predetermined distance spread the lips of the tube in order to admit the passage of the arm; reciprocating disk valves fitted to fill the interior of the tube, and provided with hollow valve stems adapted to be reciprocated and through which motive fluid is introduced; valve chambers within which said disk valves and valve stems move; cross heads and pitmen connected with said valve stems; and cams mounted upon a shaft for actuating the pitmen and cross heads of the valves; substantially as set forth.

7. The combination to form a pneumatic engine or motor, of a circular or endless tube or duct which is slit in the direction of its circumference but has the lips or edges of its slit normally closed together; a pair of circular spring rails respectively connected with the respective edges of the slit in the tube and normally adapted to retain them closed; a spreading truck connected and travelling with the piston arm for transiently wedging apart said spring controlled rails; a piston, disk, or follower, fitted within and adapted to travel around said tube, and mounted upon an arm formed to pass through a temporarily open portion of the slit in the tube and connected with a rotatable shaft concentrically mounted with respect to the tube; valves for supplying motive fluid to the tube; and means for operating said valves; substantially as set forth.

8. The combination to form a pneumatic engine or motor, of a circular or endless tube or duct of elastic material which is slit in the direction of its circumference but has the lips or edges of its slit normally closed together; a piston, disk, or follower fitted within and adapted to travel around said tube; a shaft concentrically mounted with respect to said tube; a piston arm fixedly mounted upon said shaft and extending radially therefrom a sufficient distance to permit its passage through an open portion of the slit of the tube, and then extending circumferentially or laterally a sufficient distance to place the piston, which its free end carries, at a point within the tube beyond the temporarily open portion of its slit; devices travelling with the piston arm to transiently for a predetermined distance spread the lips of the tube in order to admit the passage of the arm; valves for supplying motive fluid to the tube; and means for operating said valves, substantially as set forth.

In Testimony Whereof I have hereunto signed my name this 26th day of November, A. D., 1886

STEPHEN P M TASKER.

In the presence of
J BONSALL TAYLOR
WM C STRAWBRIDGE